United States Patent

Grünaü

[15] 3,651,646
[45] Feb. 28, 1972

[54] PNEUMATIC BARRIER SYSTEM FOR WATER SURFACES

[72] Inventor: Heinz Grünaü, Lubeck, Germany
[73] Assignee: Rudolf Harmstorf, Hamburg, Germany
[22] Filed: May 21, 1970
[21] Appl. No.: 39,262

[52] U.S. Cl. .................................61/1 R, 61/6, 210/170, 210/221
[51] Int. Cl. ........................................B01d 23/00
[58] Field of Search ................61/1 R, 1 F, 6; 210/170, 242, 210/220, 221; 137/525.1

[56] References Cited

UNITED STATES PATENTS

| | | | |
|---|---|---|---|
| 3,293,861 | 12/1966 | Hinde | 61/6 X |
| 3,422,844 | 1/1969 | Grise | 137/525.1 |
| 3,465,595 | 9/1969 | Tansony | 137/525.1 X |
| 3,491,023 | 1/1970 | McCormick | 210/242 X |

Primary Examiner—S. Leon Bashore
Assistant Examiner—Robert L. Lindsay, Jr.
Attorney—Sylvester J. Liddy, John J. Hart, Joe E. Daniels and Charles E. Baxley

[57] ABSTRACT

A system for the confinement of pollutants on water surfaces until collected or chemically dispersed. The system effects its confining action by generating a curtain or barrier of air bubbles which at the surface of the water form a series of overlapping aerated water hills capable of blocking the passage of a pollutant, such as oil film, therethrough. The system is designed to enable it to provide a continuous barrier of aerated water hills over long period of use and even though it may be installed on harbor and waterway bottoms where silty conditions prevail. This is accomplished by a pipe for supplying compressed gas to an outlet comprising a nozzle plate having an orifice of a size to allow a metered amount of air to pass with a check valve located downstream of the nozzle plate.

3 Claims, 7 Drawing Figures

PATENTED MAR 28 1972 3,651,646

INVENTOR.
HEINZ GRUNAU
BY John J. Hart
ATTORNEY

PNEUMATIC BARRIER SYSTEM FOR WATER SURFACES

THE INVENTION

The primary object of the present invention is to provide an improved pneumatic barrier for water surface pollutants that is capable of effectively accomplishing the purposes for which it was installed even after periods of disuse in a difficult environment.

Areas of water polluted with oil or other contaminant films have been isolated to prevent the spread of such films and to effect their removal by creating below the surface of the water an air bubble barrier or curtain. When the air bubbles in such barrier rise to the water surface they form a series of overlapping aerated water hills capable of preventing passage of a film across the pneumatic barrier so created. Such a barrier may be created by arranging an air conduit having a series of openings or orifices underwater in a manner to provide the form of the barrier which will be most effective in accomplishing the confinement of the pollutant in a particular situation. Air is supplied to the conduit under pressure in any suitable manner and is usually kept flowing through the conduit to maintain the pneumatic barrier until the oil film confined or retained has been collected from the surface of the water or has been chemically dispersed. This process of collection or dispersion may require hours or days to accomplish depending on the volume of the film and the conditions encountered.

When the film has been collected or dispersed, the pneumatic barrier is deactivated, i.e., the compressed air supply to the conduit is shut off. When this is done, any air remaining in the conduit escapes through the openings or orifices thereof. As the pressure of the water around the conduit becomes greater than the air pressure within the conduit, water will flow through some of the conduit openings and into the conduit. Most waterways and harbors contain at or near their bottoms, deposits of organic silt, finely divided clays, sands or sandy gravels, which form a suspension of finely divided particles. Consequently, when water flows through the openings or orifices of a conduit located in or near such an environment, it tends to carry such finely divided solids with it. It is thus necessary when compressed air is readmitted to the conduit to reestablish the pneumatic barrier to blow out the water and solids deposited within the conduit by use of an air pressure which is greater than the hydrostatic pressure of the water on the conduit. It has been found that the solid particles carried into the conduit upon deactivation of the pneumatic barrier, tend to settle and consolidate within the confined area of the conduit; and that upon readmission of compressed air into the conduit, the interaction of the turbulent flow of the compressed air displacing the water and settled particles within the conduit, causes such solid particles to plug the openings or orifices from within. When one or more orifices are partially or completely plugged, air cannot be emitted at the calculated rate to form the proper aerated water hills for confinement of the film, and the continuity of such water hills will be destroyed. Wherever the continuity of such water hills is so disrupted, the film will tend to escape thus rendering the barrier incapable of accomplishing its intended purpose.

The aforesaid objection of systems of the indicated type is overcome by the improved system hereinafter described and illustrated in the accompanying drawings, in which FIG. 1 is a schematic sectional view showing by way of example a portion of a harbor basin provided with a barrier embodying the invention;

Figure 1:
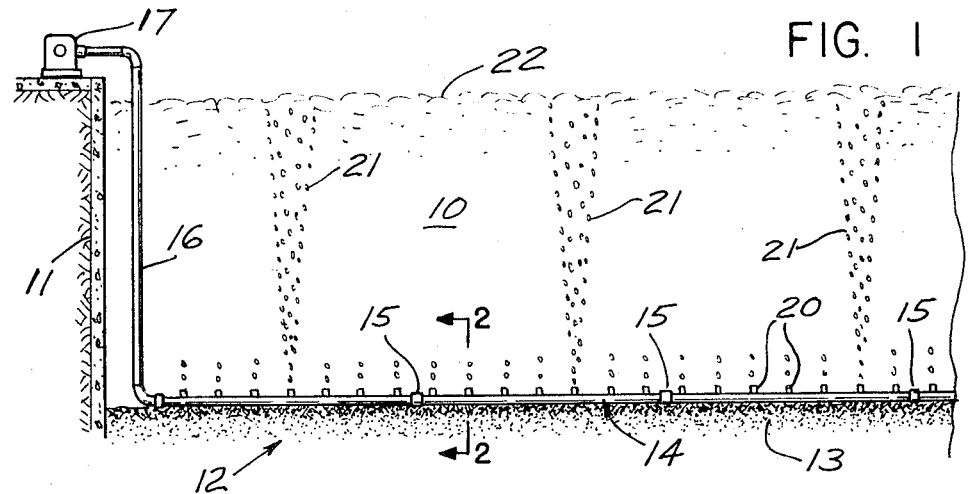

In the drawings, the numeral 10 indicates generally a harbor basin bordered on one side with a quay wall 11 and having a harbor bed 12 on which is a deposit 13 of organic silt, finely divided clay or the like. Laid on the deposit 13 is a conduit 14 composed of a plurality of conduit sections or lengths 14' connected together by couplings 15. The conduit 14 is laid in a manner to isolate the area occupied by the oil or other contaminant film to be confined and removed. Thus, the conduit 14 may extend across the basin 10, or may be given any desired form on the harbor bed 12 to effect the intended confinement of the oil film. The conduit 14 is connected at one end by a section 16 to an air compressor 17 mounted on the quay wall 11. It will be understood that if an oil film on an open area of water is to be contained, the air compressor 17 will be mounted on a vessel and the connecting conduit 16 is preferably flexible. It will also be understood that instead of laying the conduit on the bed or floor of the water area in which the oil film is located, such conduit may be supported in suspended relation from surface floats.

Figure 2:
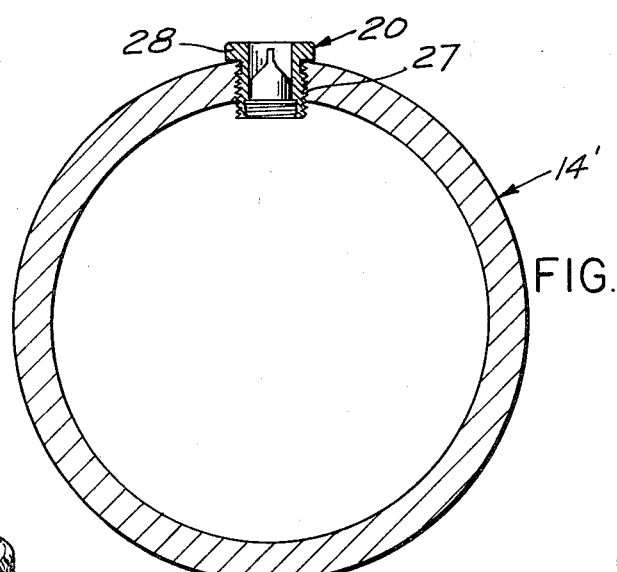
FIG. 2 is a vertical sectional view taken along the line 2—2 of FIG. 1.
Figure 3:
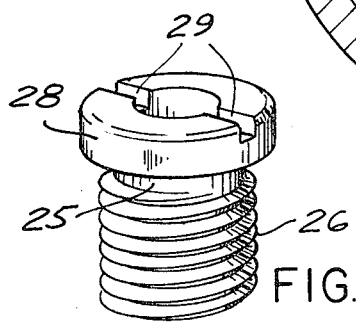
FIG. 3 is an enlarged perspective view of the body of the nozzle shown in FIG. 2.
Figure 5:
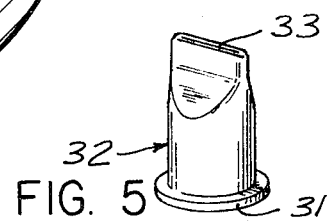
FIG. 5 is a perspective view of the check valve.
Figure 6:
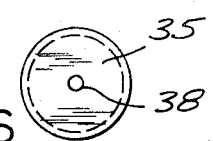
FIG. 6 is a bottom plan view of the nozzle plate.
Figure 4:
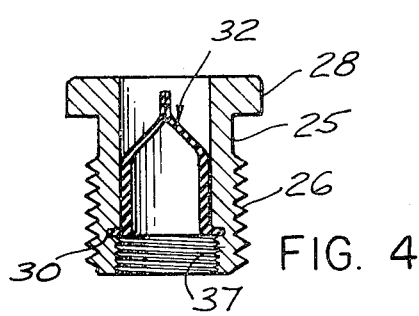
FIG. 4 is a vertical sectional view of the nozzle body shown in FIG. 3 and illustrating the manner in which the check valve is mounted therein.
Figure 7:
FIG. 7 is a perspective view of the nozzle plate.

The sections of conduit 14 may be made of any suitable material such as steel, cast iron, rubber or synthetic rubber, plastic, etc., and preferably has a relatively thick wall. In the duct sections 14' illustrated, the wall thickness is of the order of approximately one-half inch. Provided along the upper edge portion of each section 14' is a longitudinally extending series of spaced air nozzles generally designated 20 in FIGS. 1 and 2. The nozzles 20 are spaced apart a distance such that when the columns 21 of air bubbles arising therefrom reach the water surface they form a series of overlapping aerated water hills 22 which provide a continuous band or barrier having a configuration corresponding to the manner in which the conduit 14 is laid on the water floor 12. These hills 22 well out transversely on either side of their alignment and prevent the oil film from passing through the pneumatic barrier.

As is shown more clearly in FIGS. 2–7 of the drawings, each nozzle 20 is composed of a nozzle body 25 having a length approximating the thickness of the conduit wall and made of any suitable material such as plastic, metal, or synthetic rubber compound. The nozzle body is provided with an external screw thread 25 which threadedly engages a matching internal screw thread 27 provided in the wall of its associated opening in the conduit section 14'. The head 28 of the nozzle body is provided with slots 29 for receiving the tool used to screw the nozzle body 25 into position on the conduit section. Spaced approximately three-quarters of the length of the nozzle body from the head end thereof is an internal annular groove 30 in which is seated an external flange 31 provided on the lower end of a tongue sealed check valve 32. The valve 32 has a height less than the height of the nozzle body 25 above the groove 30 thereof so that it is entirely contained within such body. The tongue slit or resilient flaps 33 at the top of the check valve 32, the body of such valve and the flange 31 thereof are made of an integral piece of rubber or other suitable material. The rubber check valve 32 is preferably inserted into the nozzle body 25 through the bottom of the latter until the valve flange 31 is engaged in the nozzle body groove 30. The check valve is then locked in position by a nozzle plate 35 provided with an external screw thread 36 which is in threaded engagement with a matching internal screw thread 37 provided in the bottom end of the nozzle body below the groove 30 thereof. The nozzle plate 35 is provided with an orifice 38 through which air escapes from the conduit. It will be understood that the nozzles 20 are each completely assembled as aforesaid before being screwed into the internal threads 27 provided in the conduit openings.

It will be understood from the foregoing, that when the system is in operation compressed air supplied to the conduit 14 from the air compressor 17 escapes at each nozzle 20 in the conduit. The air escaping at each nozzle 20 initially passes through the orifice opening 38 in the nozzle plate 36 thereof. The opening 38 is of a predetermined diameter and controls the volume of air being emitted by the nozzle. The compressed air emitted through orifice 38 passes through the body of the check valve 32 and due to its excess of pressure over the hydrostatic pressure, forces apart the tongue slot 33 at the top of such body, and thence forms the bubbles which rise in a column 21 through the water and produce the water hills 22 at the water surface. When the compressed air supply is shut off, pressure within the conduit is equalized to the hydrostatic pressure by escape of air through the nozzles, and further reduced by cooling of the air within the conduit. When the hydrostatic pressure exceeds the internal pressure at the valve tops 33 of the nozzles, this pressure closes the tongue slots, thereby preventing the flow of water and solid particles back into the conduit. The hydrostatic pressure also forces the check valve flanges 31 against the inner sides of the body grooves 30 and the upper ends of the joints between the threads 36, 37 thereby sealing the nozzles 20 completely against the inflow of the solid particles in suspension therethrough and into the conduit 14.

What is claimed is:

1. A pneumatic barrier system for forming on the surface of a body of water a pollutant confining water barrier constituted of overlapping aerated water hills, comprising an underwater conduit arrangeable in a given geometric pattern defining the area of the water surface within which the pollutants are to be confined and having a plurality of air escapement openings located in given spaced relation along the length thereof, means associated with said openings for controlling the ejection of air from said conduit and the reception of solid particles into said conduit on the cessation of such air ejection, and means for supplying compressed air to said conduit for escapement through said control means against the hydrostatic pressure, said control means at each conduit opening including relatively rigid means substantially blocking the passage of air through the conduit opening and being provided with a reduced orifice of constant given dimensions through which is ejected a precise flow of pressurized air capable of forming at the water surface an aerated water hill, and said control means including a tubular member for conducting the flow of air discharged through said reduced orifice to the body of water, said tubular member having an interior diameter substantially greater than said reduced orifice and having at its discharge end resilient flaps that are relatively freely spreadable by the pressurized air flow from said orifice to permit the ejection thereof and that close automatically when the hydrostatic pressure exceeds the air pressure in said tubular member to prevent the reception through said tubular member and orifice and into said conduit of solid particles in suspension in the body of water.

2. A system as defined in claim 1, in which said rigid means is a plate having a centrally located reduced orifice, and in which said tubular member is seated at its inner end in sealed relation on the periphery of the outer face of said plate.

3. A system as defined in claim 2, in which said control means comprises a tubular housing having an external thread in threaded engagement with the wall of the conduit opening, an internal thread in its inner portion and an inner annular seat adjacent the outer end of said internal thread, said tubular member having at its inner end an external flange mounted in said annular seat and on the periphery of said plate, and means engageable with said internal thread and sealing said external flange to the periphery of the outer face of said plate.

* * * * *